(12) United States Patent
Schmidlin et al.

(10) Patent No.: US 8,069,067 B2
(45) Date of Patent: Nov. 29, 2011

(54) COMPUTER-BASED SYSTEM AND METHOD FOR ESTIMATING COSTS OF A LINE OF BUSINESS INCLUDED IN A MULTI-LINE TREATY

(75) Inventors: Gregor Schmidlin, Zuerich (CH); Stefan Bernegger, Binz (CH); Adrian Kolly, Ehrendingen (CH)

(73) Assignee: Swiss Reinsurance Company, Zurich (CH)

( * ) Notice: Subject to any disclaimer, the term of this patent is extended or adjusted under 35 U.S.C. 154(b) by 595 days.

(21) Appl. No.: 12/162,425

(22) PCT Filed: Jan. 30, 2006

(86) PCT No.: PCT/CH2006/000058
§ 371 (c)(1),
(2), (4) Date: Oct. 10, 2008

(87) PCT Pub. No.: WO2007/085097
PCT Pub. Date: Aug. 2, 2007

(65) Prior Publication Data
US 2009/0254380 A1    Oct. 8, 2009

(51) Int. Cl.
*G06Q 40/00* (2006.01)
(52) U.S. Cl. .............. 705/4; 705/7; 705/38; 705/39; 434/107
(58) Field of Classification Search ................ None
See application file for complete search history.

(56) References Cited

U.S. PATENT DOCUMENTS

| | | | |
|---|---|---|---|
| 6,186,793 B1 * | 2/2001 | Brubaker | 434/107 |
| 7,392,201 B1 * | 6/2008 | Binns et al. | 705/4 |
| 7,409,357 B2 * | 8/2008 | Schaf et al. | 705/7.28 |
| 7,698,213 B2 * | 4/2010 | Lancaster | 705/38 |
| 7,769,609 B1 * | 8/2010 | Woll | 705/4 |
| 2002/0046053 A1 * | 4/2002 | Hare et al. | 705/1 |
| 2003/0083908 A1 * | 5/2003 | Steinmann | 705/4 |
| 2003/0101132 A1 * | 5/2003 | Gaubatz et al. | 705/38 |
| 2003/0236741 A1 * | 12/2003 | Kubo et al. | 705/38 |
| 2004/0230460 A1 * | 11/2004 | Thomas et al. | 705/4 |
| 2004/0236676 A1 * | 11/2004 | Takezawa et al. | 705/38 |
| 2005/0038682 A1 * | 2/2005 | Gandee et al. | 705/4 |
| 2005/0055250 A1 * | 3/2005 | Kopold et al. | 705/4 |
| 2005/0222945 A1 * | 10/2005 | Pannicke et al. | 705/39 |
| 2006/0293926 A1 * | 12/2006 | Khury | 705/4 |
| 2007/0043656 A1 * | 2/2007 | Lancaster | 705/38 |
| 2009/0198523 A1 * | 8/2009 | Grieder et al. | 705/4 |

FOREIGN PATENT DOCUMENTS
WO    WO02086774    * 10/2002

OTHER PUBLICATIONS

Kathy R. Petroni, Stephen G. Ryan and James M. Wahlen. Discretionary and Non-Discretionary Revisions of Loss Reserves by Property-Casualty Insurers: Differential Implications for Future Profitability, Risk and Market Value. Review of Accounting Studies, 5, 95-125. © 2000.*

* cited by examiner

*Primary Examiner* — Charles Kyle
*Assistant Examiner* — Robert Niquette
(74) *Attorney, Agent, or Firm* — Oblon, Spivak, McClelland, Maier & Neustadt, L.L.P.

(57) ABSTRACT

A computer-based system and a computer-implemented method for estimating costs of a business line included in a multi-line treaty, which can determine the estimated costs for covering the insured losses of a line of business included in a multi-line treaty having an aggregate deductible and an aggregate limit.

13 Claims, 7 Drawing Sheets

COMPUTER-BASED SYSTEM AND METHOD FOR ESTIMATING COSTS OF A LINE OF BUSINESS INCLUDED IN A MULTI-LINE TREATY

FIELD OF THE INVENTION

The present invention relates to a computer-based system and a computer-implemented method for estimating costs of a business line included in a multi-line treaty. Specifically, the present invention relates to a computer-based data processing system and a computer implemented method for determining the estimated costs for covering the insured losses of a line of business included in a multi-line treaty having an aggregate deductible and an aggregate limit.

BACKGROUND OF THE INVENTION

To include as many of the client's risks as possible in a single insurance product, multi-line treaties or contracts are insurance or re-insurance treaties (contracts) whose cover extends over several lines or classes of business. Typically these lines of business have different characteristics such as association with different risks and perils, subject to different accounting conditions, and/or location in different geographical territories. In addition to a single premium, multi-line treaties have a combined deductible, i.e. an aggregate deductible, and a combined limit, i.e. an aggregate limit. Nevertheless, it is possible that the different lines of business covered in a multi-line treaty are also associated with their own individual limits. Generally, difficulties with multi-line treaties, that typically combine different liability and property classes of business, lie in rating and monitoring claims experience and in managing provisions of capital (costs of capital). Management of provisions of capital is particularly difficult in cases where the different lines of business included in the treaty correspond to different business areas of the insurer or re-insurer. Depending on the lines of business, some losses to be covered may become known within the treaty period or soon thereafter, others may become known only years after the treaty period. Consequently, it is difficult to assess the influence of the combined limits of a multi-line treaty onto its components related to the different lines of business and to determine the costs of insured losses to be covered by the individual business areas.

SUMMARY OF THE INVENTION

It is an object of this invention to provide a computer-based data processing system and a computer implemented method for determining the estimated costs for covering the insured losses of a line of business included in a multi-line treaty. In particular, it is an object of the present invention to provide a computer-based data processing system and a computer implemented method for estimating the costs for covering the insured losses of the line of business included in a multi-line treaty having an aggregate deductible and an aggregate limit.

According to the present invention, these objects are achieved particularly through the features of the independent claims. In addition, further advantageous embodiments follow from the dependent claims and the description.

According to the present invention, the above-mentioned objects are particularly achieved in that, for determining the estimated costs for covering the insured losses of a line of business included in a multi-line treaty having an aggregate deductible and an aggregate limit, for each line of business included in the treaty, determined is a loss distribution, indicative of a temporal course of losses expected for the line of business. Furthermore, adjusted losses are determined for each line of business, included in the treaty, by splitting proportionally, among the lines of business, an effect of the aggregate deductible and the aggregate limit on the losses expected for the lines of business, at different points in time of the temporal course. Thereafter, the estimated costs are determined for a line of business from the adjusted losses for the line of business. Preferably, for each of the lines of business, capital provisions are determined from the adjusted losses for the line of business. Determining temporal courses of the expected losses and splitting proportionally the effect of the aggregates at different points in the temporal course have the advantage that the effect of aggregates is split continuously among the lines of business throughout the temporal course, at least for each calculation period, e.g. annually, in a settlement period.

In a preferred embodiment, for each line of business included in the treaty, determined is a temporal course over multiple calculation periods of a cumulative loss expected per calculation period. For example, for an overall settlement period comprising six years, the cumulative loss expected for each of the business lines is determined for each year. Moreover, for each of the calculation periods, determined is an adjustment factor, indicative of the effect of the aggregate deductible and the aggregate limit on the cumulative losses expected for the lines of business at the respective calculation period. Subsequently, the respective adjustment factor is applied to the cumulative loss of the line of business for each of the calculation periods. For example, an adjustment factor is determined for each year of the settlement period and adjusted is the cumulative loss of each line of business for each year of the settlement period.

In a further preferred embodiment, the adjustment factor is determined by determining, for any one of the calculation periods, an aggregate loss of the lines of business, included in the treaty, from the temporal courses determined for each line of business, included in the treaty. Subsequently, for the one of the calculation periods, the adjustment factor is determined as a ratio of the aggregate loss of the treaty that exceeds the aggregate deductible but does not exceed the aggregate limit. For example, the adjustment factor is determined for each year of the settlement period as the ratio of the year's aggregate loss that is within the covered (insured) range, defined by the treaty's (annual) aggregate deductible and the treaty's (annual) aggregate limit.

In an embodiment, an individual deductible and an individual limit are associated with each line of business. For each line of business, the respective individual deductible is deducted from the cumulative loss, expected for the respective line of business, and the cumulative loss is limited to the respective individual limit.

In addition to a computer-based data processing system and a computer-implemented method for determining the estimated costs for covering the insured losses of a line of business included in a multi-line treaty, the present invention also relates to a computer program product including computer program code means for controlling one or more processors of a computer, particularly, a computer program product including a computer readable medium containing therein the computer program code means.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
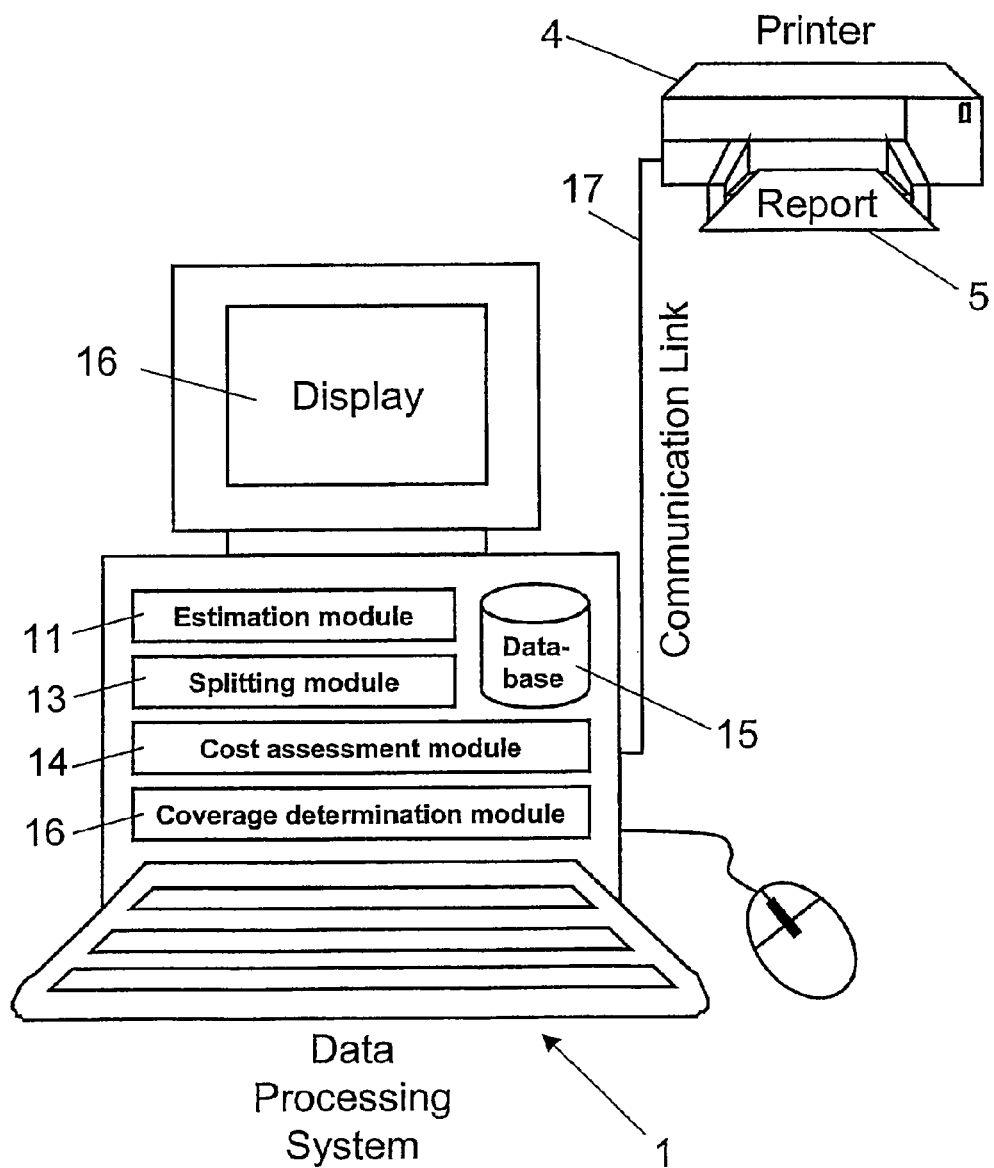
FIG. 1 shows a block diagram illustrating schematically an exemplary configuration of a computer-based data processing system for practicing embodiments of the present invention, said configuration comprising a computer with a processor and memory, data entry means, and a display.

In FIG. 1, reference numeral 1 refers to a computer-based data processing system. The data processing system 1 includes one or more computers, for example personal computers, comprising one or more processors, data and program memory. As is illustrated schematically, the data processing system 1 includes a display 16 and data entry means, such as a keyboard and/or a pointing device. Moreover, the data processing system 1 is connected to a printer 4 via a communication link 17.

As is illustrated schematically in FIG. 1, the data processing system 1 further includes a database 15 and various functional modules namely an estimation module 11, a splitting module 13, a cost assessment module 14, and a coverage determination module 16. Preferably, the functional modules and the database 15 are implemented as programmed software modules. The computer program code of the software modules is stored as a computer program product, e.g. on a computer readable medium, either in memory integrated in a computer of the data processing system 1 or on a data carrier that can be inserted into a computer of the data processing system 1. The computer program code of the software modules controls the computer(s) of the data processing system 1 so that the data processing system 1 executes various functions described later in more detail with reference to FIGS. 2 to 7.

Figure 2:
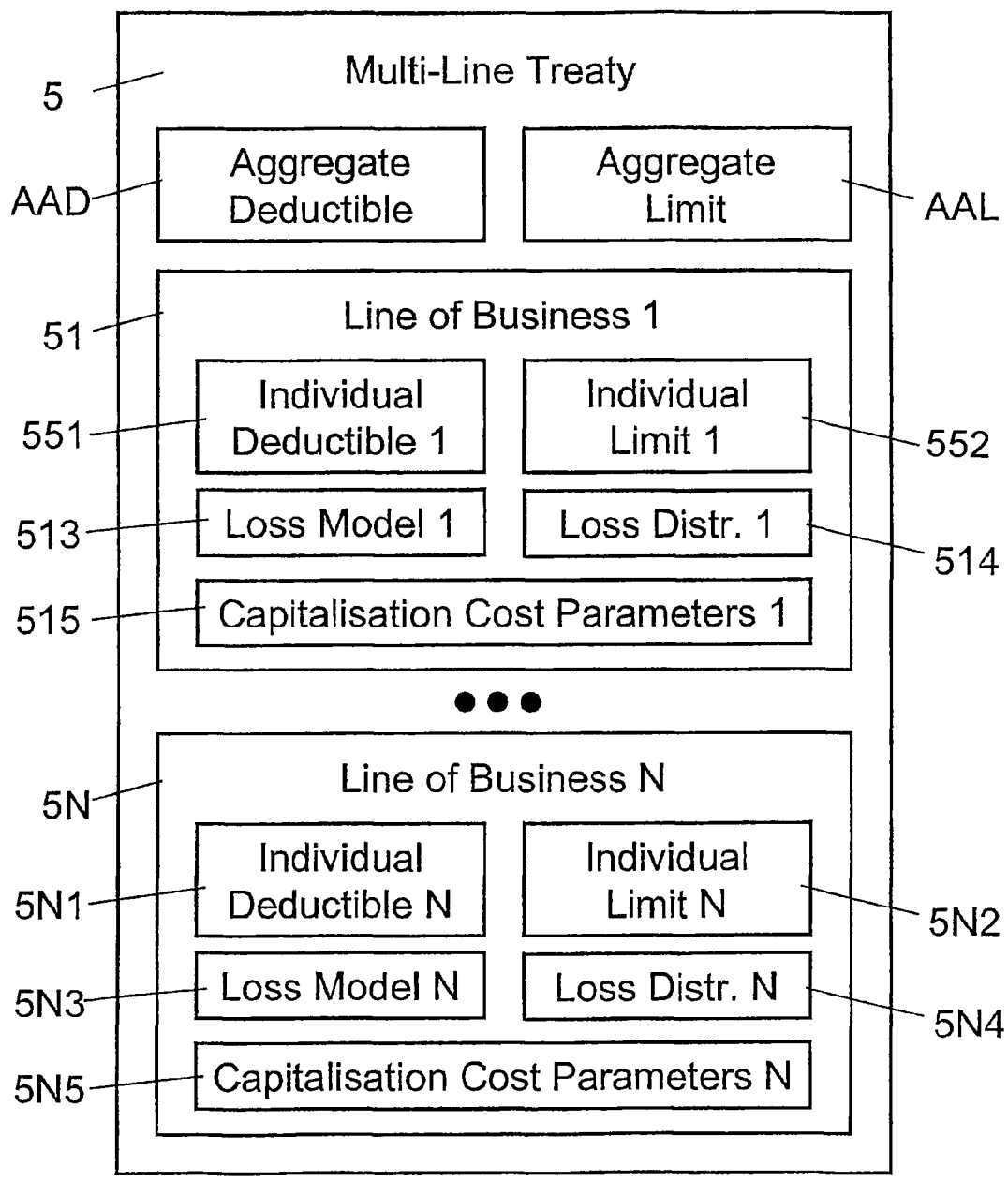
FIG. 2 shows a block diagram illustrating schematically an example of a data structure for a multi-line treaty.

The database 15 is implemented as a relational database system, as a spreadsheet or as a sequential file, for example, and includes data related to multi-line treaties. As is illustrated in FIG. 2, a data structure of a multi-line treaty 5 includes an (e.g. annual) aggregate deductible AAD and an (e.g. annual) aggregate limit ML associated with the multi-line treaty. Moreover, the data structure of the multi-line treaty includes data structures for multiple lines of business 51, 5N. A data structure for a line of business 51, 5N includes optionally a data element for an individual deductible 551, 5N1 and an individual limit 552, 5N2 associated with the line of business. Furthermore, the data structures for a line of business 51, 5N include a loss model 513, 5N3, a loss distribution 514, 5N4, and capitalization parameters 515, 5N5.

Figure 3:
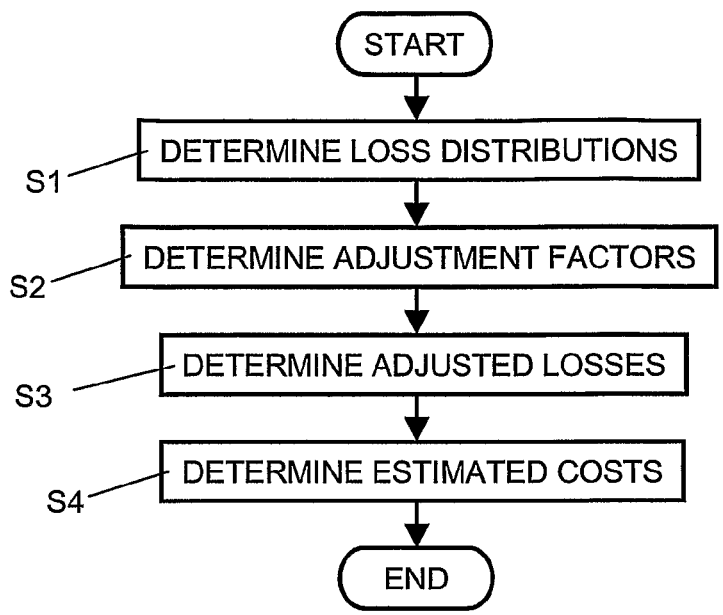
FIG. 3 shows a flow diagram illustrating an example of a sequence of steps executed to determine estimated costs of a line of business included in a multi-line treaty.

As is illustrated in FIG. 3, in step S1, for determining the estimated costs for covering insured losses of a line of business included in a multi-line treaty, the estimation module 11 determines for each line of business included in the treaty a loss distribution 514, 5N4, e.g. an ultimate annual loss distribution. The loss distributions are each determined based on a loss model 513, 5N3 associated with the line of business 51, 5N. The loss models 513, 5N3 are defined/entered by an underwriter, for example, and include data (frequency, amount) related to the expected losses of a respective line of business (based on assumptions and/or historical data) and to contract conditions (e.g. deductibles and limits).

Figure 4:
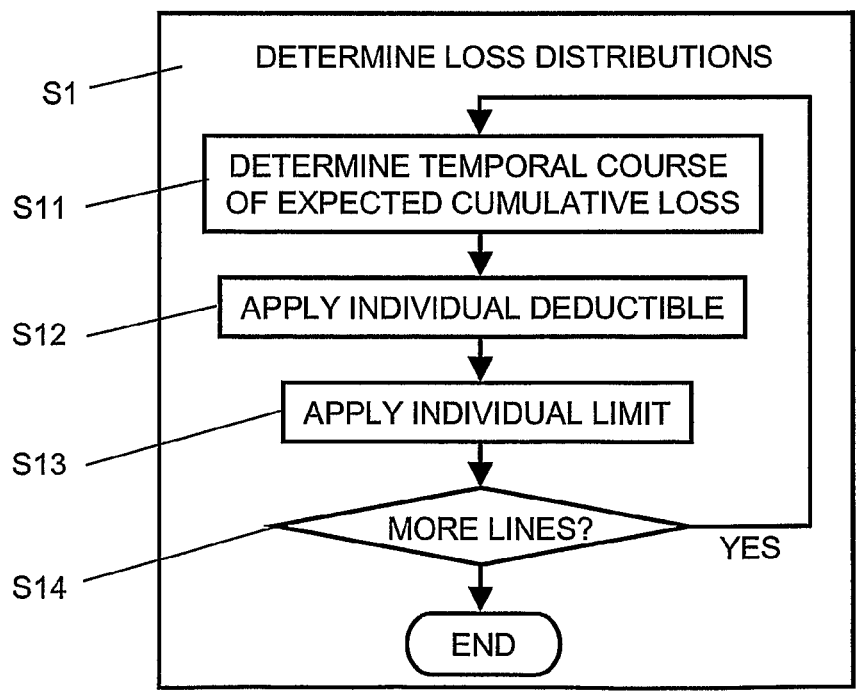
FIG. 4 shows a flow diagram illustrating an example of a sequence of steps executed to determine loss distributions.

As is shown in FIG. 4, in step S11, the estimation module 11 determines for a particular line of business, included in the multi-line treaty, the temporal course of the cumulative loss expected for the line of business. The temporal course is determined based on loss parameters such as different loss distributions (e.g. for property insurance, weather-dependent insurance, life insurance, etc.) and stored as ultimate annual loss distribution 514, 5N4.

In step S12, if the line of business is associated with an individual deductible, the estimation module 11 applies the individual deductible to the temporal course of the cumulative loss as determined in step S11. Specifically, in step S12, the individual deductible associated with the line of business is deducted from the values of the cumulative losses included in the temporal course.

In step S13, if the line of business is associated with an individual limit, the estimation module 11 applies the individual limit to the temporal course of the cumulative loss as determined in step S11 and possibly modified in step S12. Specifically, in step S13, the values of the cumulative losses included in the temporal course are limited (capped) to the individual limit associated with the line of business.

Figure 9:
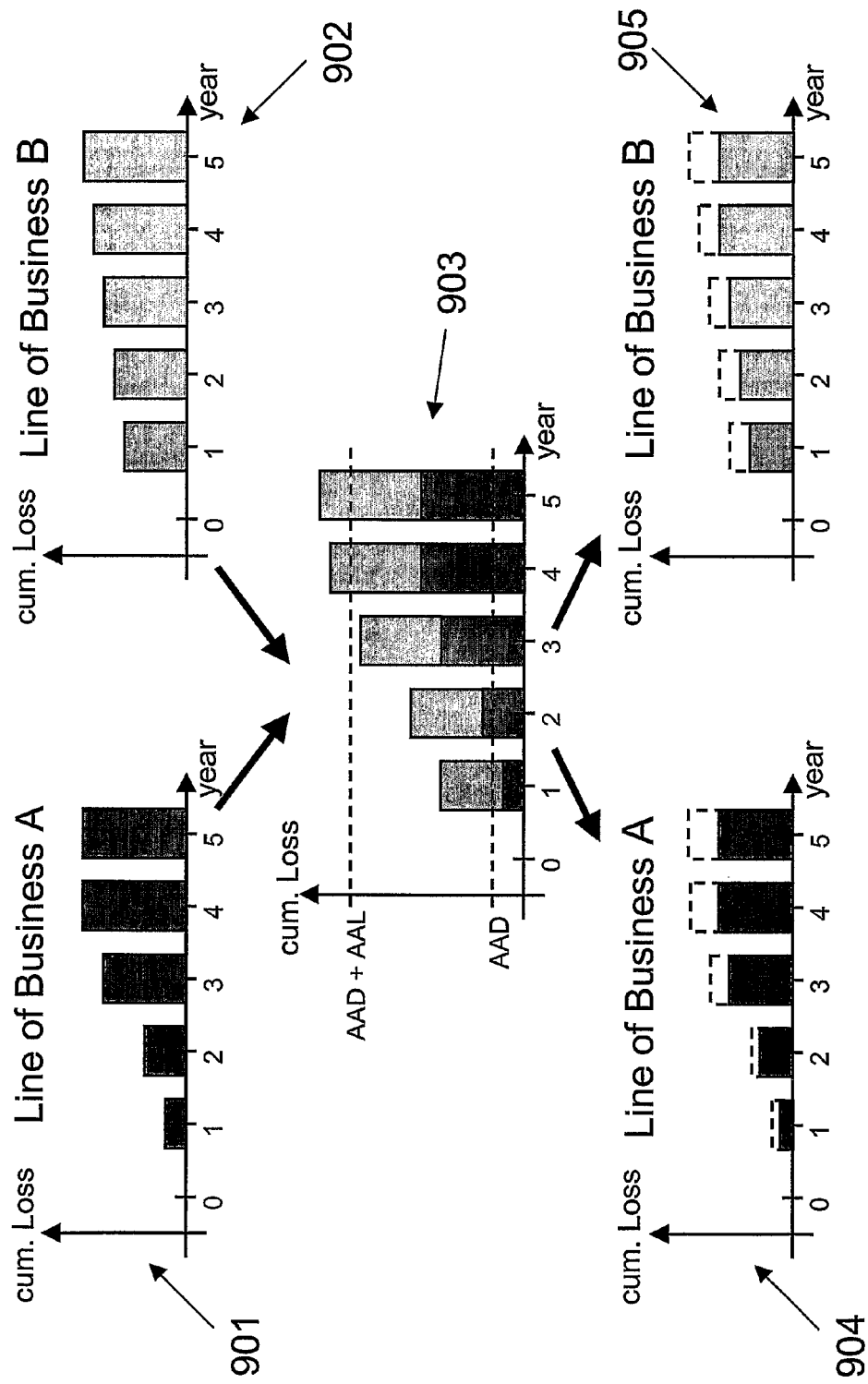
FIG. 9 shows a block diagram illustrating schematically an example of the adjustment of the estimated losses expected for two business lines for a number of years.

Subsequently, each of the multi-line treaty's 5 line of business 51, 5N includes a temporal course of cumulative losses $L_{N,j}^{LoB_k}$ expected for the line of business $LoB_k$ at subsequent calculation periods, e.g. at years j. For example, the temporal course includes multiple years and indicates the course of the annual cumulative loss of a line of business throughout these years. Depending on the embodiment, applied to the loss model are individual deductibles and limits associated with the line of business. Examples of the temporal courses of the estimated cumulative losses of lines of business A and B are illustrated in FIG. 9 in graphs 901 or 902, respectively.

In step S14, the estimation module 11 determines whether or not there are further lines of business 51, 5N of the multi-line treaty 5 to be processed, and the estimation module 11 proceeds in step S11 or ends in-step S1.

In step S2, the splitting module 13 determines adjustment factors $A_j$ for splitting proportionally the effects of the (annual) aggregate deductible AAD and the (annual) aggregate limit AAL for each calculation period, e.g. for each year j included in the temporal course, among the lines of business included in the multi-year treaty.

Figure 5:
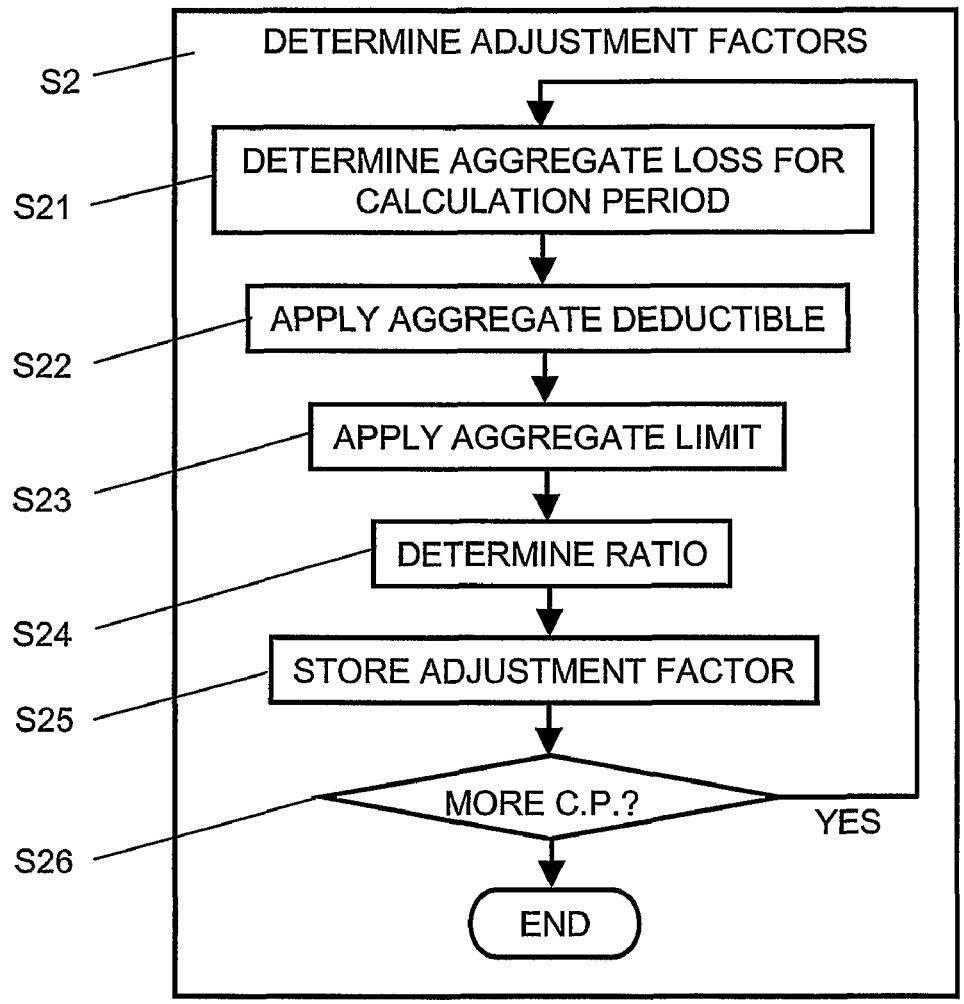
FIG. 5 shows a flow diagram illustrating an example of a sequence of steps executed to determine adjustment factors.

In step S21, illustrated in FIG. 5, the splitting module 13 determines the aggregate loss $L_j$ (distribution) expected for all the lines of business included in the treaty for a calculation period, e.g. for the year j. The aggregate loss $L_j$ is calculated from the values included in the temporal courses determined in step S1. Specifically, the aggregate loss $L_j$ for a calculation period, e.g. a year j, is calculated through addition of the respective annual cumulative losses $N_{N,j}^{LoB_k}$ included in the temporal courses, determined in step S1, for all the lines of business $\text{LoB}_k$ included in the treaty.

$$L_j = \sum_k L_{N,j}^{LoB_k}$$

In step S22, the splitting module 13 applies the aggregate deductible to the aggregate loss distribution, calculated in step S21 for the calculation period, e.g. for the year. Specifically, in step S22, the (annual) aggregate deductible (AAD) associated with the treaty is deducted from the value of the aggregate loss.

In step S23, the splitting module 13 applies the aggregate limit to the aggregate loss distribution calculated in step S21 and modified in step S22. Specifically, in step S23, the aggregate loss for the calculation period, e.g. for the year, is limited to the (annual) aggregate limit (AAL) associated with the treaty.

In step S24, the splitting module 13 determines the ratio of the aggregate loss that exceeds the aggregate deductible but does not exceed the aggregate limit. Specifically, in step S24, calculated is the ratio of the insured aggregate loss or nominal loss $L_{N,j}$, i.e. the aggregate loss calculated in step S21 and having applied thereto the (annual) aggregate deductible (AAD) in step S22 and the (annual) aggregate limit (AAL) in step S23, to the aggregate loss $L_j$ calculated in step S21. In step S25, the ratio calculated in step S24 is stored as the adjustment factor $A_j$ for the calculation period, e.g. for the year j.

$$A_j = L_{N,j}/L_j = L_{N,j} \bigg/ \sum_k L_{N,j}^{LoB_k}$$

In step S26, the splitting module 13 determines whether or not there are further calculation periods, e.g. years j, in the temporal course to be processed, and the splitting module 13 proceeds in step S21 or ends in step S2.

In step S3, the splitting module 13 calculates adjusted losses $\hat{L}_{N,j}^{LoB_l}$ for each line of business $\text{LoB}_l$ included in the treaty.

Figure 6:
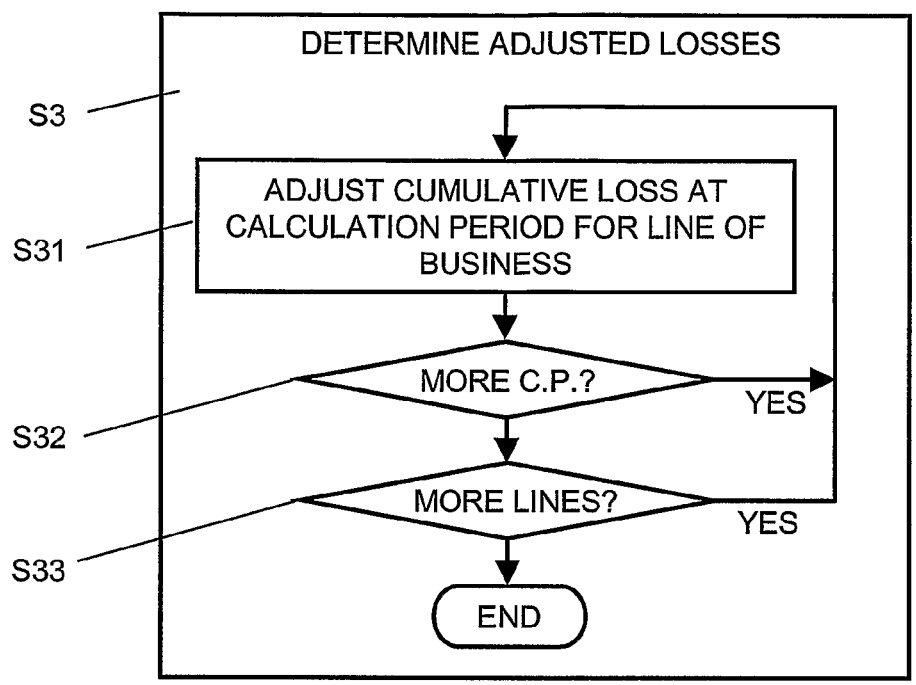
FIG. 6 shows a flow diagram illustrating an example of a sequence of steps executed to determine adjusted losses.

In step S31, illustrated in FIG. 6, the splitting module 13 adjusts the cumulative loss for a calculation period, e.g. a year j, for a line of business. Specifically, the splitting module 13 multiplies the annual cumulative loss $L_{N,j}^{LoB_l}$ of a line of business $\text{LoB}_l$ with the respective adjustment factor $A_j$ stored in step S25.

$$\hat{L}_{N,j}^{LoB_l} = L_{N,j}^{LoB_l} \cdot A_j = L_{N,j}^{LoB_l} \cdot L_{N,j} \bigg/ \sum_k L_{N,j}^{LoB_k}$$

In step S32, the splitting module 13 determines whether or not there are further calculation periods, e.g. years j, in the temporal course to be processed, and the splitting module 13 proceeds to step S31 or step S33.

In step S33, the splitting module 13 determines whether or not there are further lines of business included in the treaty to be processed, and the splitting module 13 proceeds in step S31 or ends in step S3.

Figure 8:
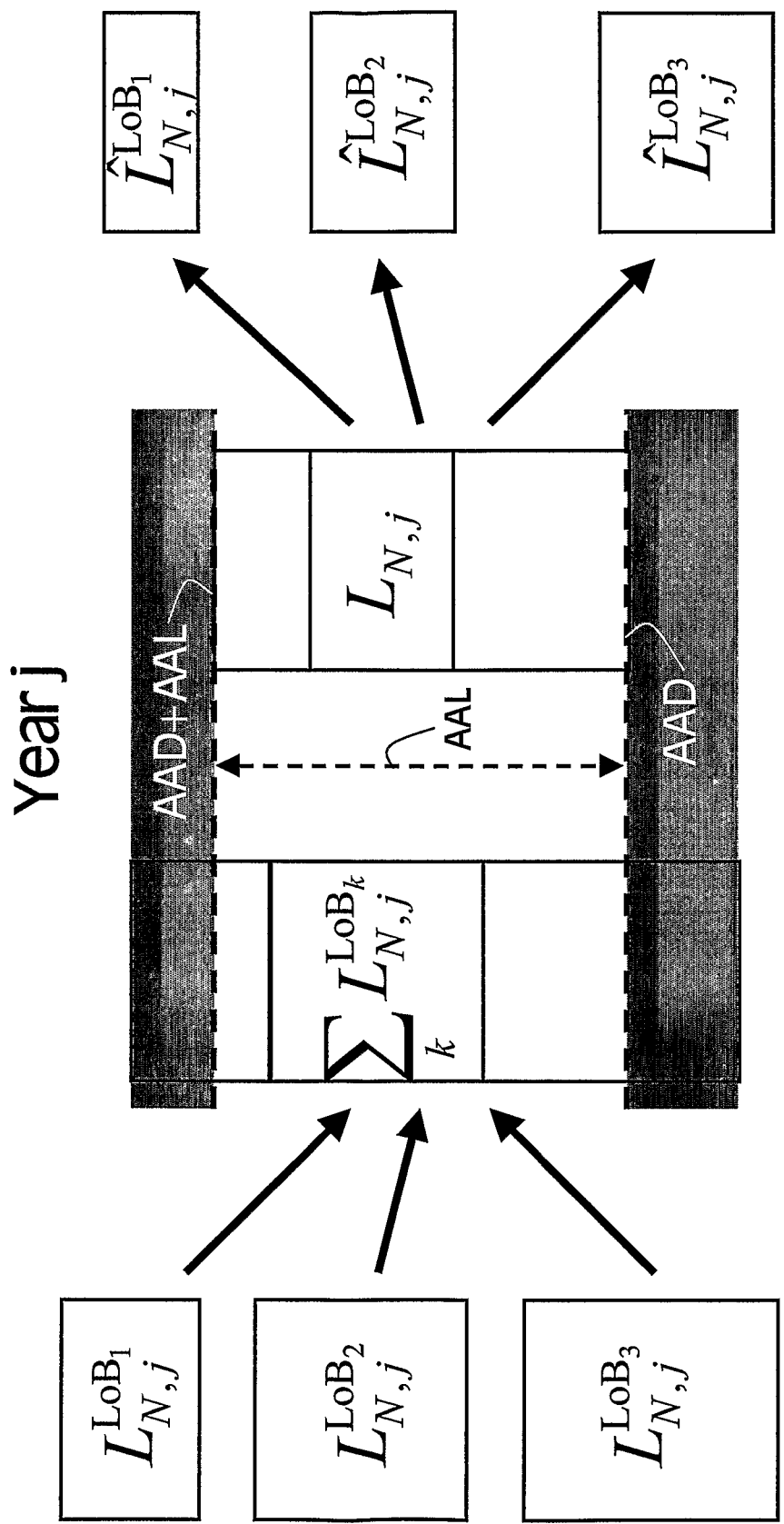
FIG. 8 shows a block diagram illustrating schematically the adjustment of estimated losses expected for three business lines for a particular year.

In FIG. 8, an example is shown of adjusting proportionally for year j the annual cumulative losses $L_{N,j}^{LoB_1}$, $L_{N,j}^{LoB_2}$, $L_{N,j}^{LoB_3}$ of the lines of business $\text{LoB}_1$, $\text{LoB}_2$, and $\text{LoB}_3$. The annual aggregate loss $L_j$ is calculated as the sum $$\sum_k L_{N,j}^{LoB_k}$$

of the annual cumulative losses. The insured or nominal loss $L_{N,j}$ includes the sum of the adjusted cumulative losses $\hat{L}_{N,j}^{LoB_1}$, $\hat{L}_{N,j}^{LoB_2}$, $\hat{L}_{N,j}^{LoB_3}$ of the lines of business $\text{LoB}_1$, $\text{LoB}_2$, and $\text{LoB}_3$.

In FIG. 9, graph 903 shows the annual aggregate losses calculated through addition of the annual cumulative losses, included in the temporal courses for the lines of business A and B, shown in graph 901 or 902, respectively. Graphs 904 and 905 show the adjusted losses for the line of business 1 or 2, respectively, calculated from the aggregate losses, shown in graph 903.

In step S4, the cost assessment module 14 determines the estimated costs for covering the insured (nominal) losses of a line of business, included in the multi-line treaty, from the adjusted losses for the line of business.

Figure 7:
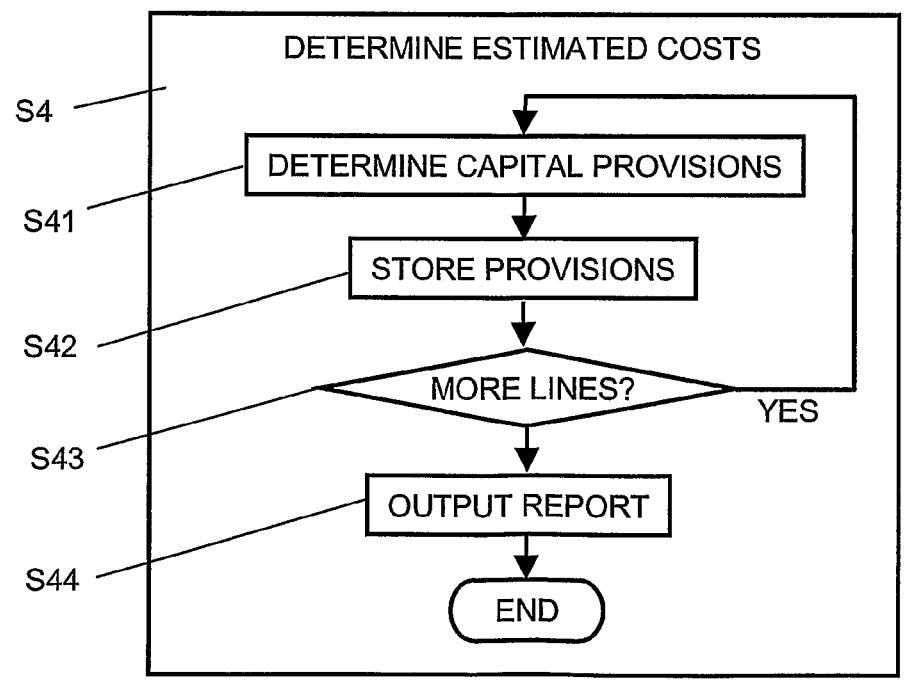
FIG. 7 shows a flow diagram illustrating an example of a sequence of steps executed to determine estimated costs.

In step S41, illustrated in FIG. 7, the cost assessment module 14 determines for a line of business capital provisions from the adjusted losses, determined in step S3 for the line of business, using capitalization parameters 514, 5N4 associated with the respective line of business.

In step S42, the cost assessment module 14 stores the capital provisions determined in step S41 for the line of business with the capitalization parameters 514, 5N4.

In step S43, the cost assessment module 14 determines whether or not there are further lines of business 51, 5N included in the multi-line treaty 5 to be processed, and the cost assessment module 14 proceeds in step S41 or, in step S44, produces a result report 5 on printer 4 or display 16. Preferably, the report includes the capitalization costs (capital provisions) for the lines of business included in the treaty.

Based on the adjustment described above, the sum of the adjusted nominal losses per line of business is equal to the total nominal loss $L_N$:

$$\sum_k \hat{L}_N^{LoB_k} = L_N.$$

Furthermore, the sum of adjusted discounted losses per line of business is equal to the total discounted loss $L_D$:

$$\sum_k \hat{L}_D^{LoB_k} = L_D.$$

In addition, the sum of the adjusted nominal losses per line of business weighted with the average settlement time is equal to the total nominal loss $L_N$ multiplied with the average settlement time $\tau$:

$$\sum_k \hat{L}_N^{LoB_k} \hat{\tau}^{LoB_k} = L_N \tau.$$

Owing to the achieved consistency, standard formulas are still valid between the adjusted figures.

In describing representative embodiments of the invention, the specification may have presented the method and/or process of the invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the invention should not be limited to the performance of their steps in the order written, and one skilled in the art can readily appreciate that the sequences may be varied and still remain within the spirit and scope of the invention. The foregoing disclosure of the embodiments of the invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents. Specifically, in the description, the computer program code has been associated with specific software modules, one skilled in the art will understand, however, that the computer program code may be structured differently, without deviating from the scope of the invention.

What is claimed is:

1. A computer-based data processing system for determining estimated costs for covering insured losses of a line of business included in a multi-line treaty having an aggregate deductible and an aggregate limit, the system comprising:
   an estimation module configured to determine for each line of business included in the multi-line treaty a loss distribution indicative of a temporal course of losses expected for the line of business, and a temporal course over multiple calculation periods of a cumulative loss expected per calculation period;
   a splitting module configured to determine, via a processor, adjusted losses for each line of business included in the multi-line treaty by splitting proportionally among the lines of business an effect of the aggregate deductible and the aggregate limit on the losses expected for the lines of business at different points in time of the temporal course, and to determine, via the processor, for each of the calculation periods an adjustment factor, indicative of the effect of the aggregate deductible and the aggregate limit on the cumulative losses expected for the lines of business at the respective calculation period, and to apply the respective adjustment factor to the cumulative loss of the line of business for each of the calculation period; and
   a cost assessment module configured to determine the estimated costs for a line of business from the adjusted losses for the line of business.

2. The system according to claim 1, wherein the cost assessment module is further configured to determine for each of the lines of business, capital provisions from the adjusted losses for the line of business.

3. The system according to claim 1, wherein the splitting module is further configured
   to determine for any one of the calculation periods an aggregate loss of the lines of business included in the treaty from the temporal courses determined for each line of business included in the treaty, and
   to determine for the one of the calculation periods the adjustment factor as a ratio of the aggregate loss of the multi-line treaty that exceeds the aggregate deductible but does not exceed the aggregate limit.

4. The system according to claim 1, further comprising:
   a memory unit configured to store an individual deductible and an individual limit each associated with each line of business; and
   a coverage determination module configured to deduct for each line of business, the respective individual deductible from the cumulative loss expected for the respective line of business and to limit the cumulative loss to the respective individual limit.

5. A computer-implemented method of determining estimated costs for covering insured losses of a line of business included in a multi-line treaty having an aggregate deductible and an aggregate limit, the method comprising:
   determining, for each line of business included in the multi-line treaty, a loss distribution indicative of a temporal course of losses expected for the line of business;
   determining, for each line of business including in the multi-line treaty, a temporal course over multiple calculation periods of a cumulative loss expected per calculation period;
   determining, via a processor, adjusted losses for each line of business included in the multi-line treaty by splitting proportionally among the lines of business an effect of the aggregate deductible and the aggregate limit on the losses expected for the lines of business at different points in time of the temporal course;
   determining, via the processor, for each of the calculation periods an adjustment factor, indicative of the effect of the aggregate deductible and the aggregate limit on the cumulative losses expected for the lines of business at the respective calculation period;
   applying the respective adjustment factor to the cumulative loss of the line of business for each of the calculation period; and
   determining the estimated costs for a line of business from the adjusted losses for the line of business.

6. The method according to claim 5, wherein capital provisions from the adjusted losses for the line of business are determined for each of the lines of business.

7. The method according to claim 5,
   wherein determining an adjustment factor includes
      determining, for any one of the calculation periods, an aggregate loss of the lines of business included in the treaty from the temporal courses determined for each line of business included in the treaty and
      determining for the one of the calculation periods the adjustment factor as a ratio of the aggregate loss of the multi-line treaty that exceeds the aggregate deductible but does not exceed the aggregate limit.

8. The method according to claim 5,
   further comprising:
   associating an individual deductible and an individual limit with each line of business;
   deducting, for each line of business, the respective individual deductible from the cumulative loss expected for the respective line of business; and
   limiting the cumulative loss to the respective individual limit.

9. A non-transitory computer-readable medium storing computer readable instructions thereon that when executed by a processor cause the processor to perform a method comprising storing data about a multi-line treaty, including multiple lines of business associated with the multi-line treaty, and an aggregate deductible and an aggregate limit assigned to the multi-line treaty;

determining, for each line of business included in the multi-line treaty, a loss distribution indicative of a temporal course of losses expected for the line of business;

determining, for each line of business including in the multi-line treaty, a temporal course over multiple calculation periods of a cumulative loss expected per calculation period;

determining adjusted losses for each line of business included in the multi-line treaty by splitting proportionally among the lines of business an effect of the aggregate deductible and the aggregate limit on the losses expected for the lines of business at different points in time of the temporal course;

determining for each of the calculation periods an adjustment factor, indicative of the effect of the aggregate deductible and the aggregate limit on the cumulative losses expected for the lines of business at the respective calculation period;

applying the respective adjustment factor to the cumulative loss of the line of business for each of the calculation period; and determining the estimated costs for a line of business from the adjusted losses for the line of business.

10. The non-transitory computer-readable medium according to claim 9, wherein business capital provisions from the adjusted losses for the line of business are determined for each of the lines of business.

11. The non-transitory computer-readable medium according to claim 9, further comprising:

determining the adjustment factor by determining for any one of the calculation periods an aggregate loss of the lines of business included in the treaty from the temporal courses determined for each line of business included in the treaty, and determining for the one of the calculation periods the adjustment factor as a ratio of the aggregate loss of the multi-line treaty that exceeds the aggregate deductible but does not exceed the aggregate limit.

12. The non-transitory computer-readable medium according to claim 9, further comprising:

associating an individual deductible and an individual limit with each line of business;

deducting for each line of business the respective individual deductible from the cumulative loss expected for the respective line of business, and limiting the cumulative loss to the respective individual limit.

13. A method, implemented by a computer-based data processing apparatus, of determining estimated costs for covering insured losses of a line of business included in a multi-line treaty having an aggregate deductible and an aggregate limit, the method comprising:

determining, for each line of business included in the multi-line treaty, a loss distribution indicative of a temporal course of losses expected for the line of business;

determining, for each line of business including in the multi-line treaty, a temporal course over multiple calculation periods of a cumulative loss expected per calculation period;

determining, via a processor of the computer-based data processing apparatus, adjusted losses for each line of business included in the multi-line treaty by splitting proportionally among the lines of business an effect of the aggregate deductible and the aggregate limit on the losses expected for the lines of business at different points in time of the temporal course;

determining, via a processor, for each of the calculation periods an adjustment factor, indicative of the effect of the aggregate deductible and the aggregate limit on the cumulative losses expected for the lines of business at the respective calculation period;

applying the respective adjustment factor to the cumulative loss of the line of business for each of the calculation period; and determining the estimated costs for a line of business from the adjusted losses for the line of business.

\* \* \* \* \*